United States Patent

Pan

[19]

[11] Patent Number: 6,147,786
[45] Date of Patent: Nov. 14, 2000

[54] HYBRID ANALOG/DIGITAL WDM ACCESS NETWORK WITH MINI-DIGITAL OPTICAL NODE

[75] Inventor: Jin-Yi Pan, Burlington, Mass.

[73] Assignee: Nokia Telecommunications, OY, Espoo, Finland

[21] Appl. No.: 09/027,259

[22] Filed: Feb. 20, 1998

[51] Int. Cl.[7] .................................................. H04J 14/02
[52] U.S. Cl. ........................... 359/124; 359/125; 455/5.1
[58] Field of Search .................................... 359/118, 125; 455/5.1

[56] References Cited

U.S. PATENT DOCUMENTS

| | | | |
|---|---|---|---|
| 5,136,411 | 8/1992 | Paik et al. ................................. | 359/125 |
| 5,202,780 | 4/1993 | Fussgänger . | |
| 5,808,764 | 9/1998 | Frigo et al. ............................... | 359/127 |
| 5,864,415 | 1/1999 | Williams et al. ......................... | 359/125 |
| 5,864,748 | 1/1999 | Dail .......................................... | 455/5.1 |
| 5,911,019 | 6/1999 | Cohen ....................................... | 385/24 |

FOREIGN PATENT DOCUMENTS

| | | |
|---|---|---|
| 0 703 681 A2 | 3/1996 | European Pat. Off. . |
| 0 782 285 A2 | 7/1997 | European Pat. Off. . |

*Primary Examiner*—Jason Chan
*Assistant Examiner*—Dalzid Singh
*Attorney, Agent, or Firm*—Altera Law Group LLC

[57] ABSTRACT

A hybrid, bi-directional, analog/digital WDM access network system, for transmitting/receiving a wavelength of analog signals and a plurality of wavelengths of digital signals which are communicated between a network and a plurality of users, includes a feeder/de/multiplexer for converting the wavelength of analog signals into electrical signals and de/multiplexing the wavelengths of digital signals into a plurality of one-wavelength of digital signals; a plurality of mini-digital optical nodes connecting individually to the feeder/de/multiplexer via a plurality of optic fibers, respectively, each of the mini-digital optical nodes converting one of the one-wavelength of digital signals into electrical signals; and wherein the analog and digital converted electrical signals are transmitted to the user. A method of downstream transmission from the network to the users and a method of upstream transmission from the users to the network includes steps of communicating the signals among the feeder/de/multiplexer, mini-digital nodes, optic fibers, a coax cable and/or a digital line.

28 Claims, 5 Drawing Sheets

HYBRID ANALOG/DIGITAL WDM ACCESS NETWORK WITH MINI-DIGITAL OPTICAL NODE

BACKGROUND OF THE INVENTION

1. Field of the Invention

This invention relates in general to a Wavelength Division Multiplexing (WDM) technology used in a network access system, and more particularly to a hybrid analog/digital WDM technology used in a network access system.

2. Description of Related Art

The phenomenal growth of Internet and other broadband applications has generated more and more data transport demand in network communication industry. Fiber optical communication networks have been traditionally used in the local or wide area networks. Traditional Hybrid Fiber Coax (HFC) network is generally shown in FIG. 3 (see later for details). Usually, the digital and/or analog signals are first transformed into optical signals, and then the optical signals are transmitted via an optic fiber from a remote provider to a user end. As shown in FIG. 3, the signals (arrow-down) are split by a splitter into several branches (usually four branches in the existing CATV network). The optical signals in each fiber branch are then converted into electrical signals at an optical node. The converted electrical signals are next sent to various users via coax cables either via bus configuration (as shown) or star configuration (not shown). In this conventional hybrid fiber coax network, the digital service typically use 550–750 MHz for downstream (i.e. from a service provider to a user), assuming a coax amplifier allows bandwidth up to 750 MHz, and use 5–50 MHz for upstream (i.e. from a user to a service provider), which translates into about 800 Mbps (Mega bits per second) downstream and 160 Mbps upstream using 64 QAM for modulation. This data transport capacity can be typically shared by about 2000 users in one fiber serving area as illustrated in FIG. 3. However, with the high demand for bandwidth (i.e. the signal transport capacity), 800 Mbps is not enough at all, not to say the much slower upstream signal transport capacity.

Further, due to the fact that bandwidth provided in the upstream direction is in the lower band arrange, the signals can be readily interfered by a noisy lower band. Furthermore, if bandwidth itself is very narrow, it would significantly reduce the speed of signal transfer in an upstream transmission.

To understand further on the limitation and disadvantages of the existing network systems, the emphasis should be made to focus on the source and current solutions to the challenges faced by telecommunication industry. It can be seen that as more and more users start to use data networks, and as the usage evolves to include more and more bandwidth, intensive networking applications such as data browsing on the World Wide Web (WWW), Java applications, video-conferencing, etc., there emerges an acute need for very high-bandwidth transport network facilities, whose capabilities are much beyond those that current high-speed asynchronized transfer mode (ATM) networks can provide. The "network lag" in Internet creates more and more problems for users to access a World Wide Web server especially to display a picture. The demand for increasing the bandwidth in today's networks becomes a priority in every communication system. Realizing that the maximum rate at which an end-user (e.g. a work station or a gateway that interfaces with lower-speed subnetworks) can access the network is limited by electronic speed, the key in designing optical communication networks in order to exploit the fibers huge bandwidth is to introduce concurrency among multiple user transmissions into the network architectures and the protocols. In an optical communication network, this concurrency is often provided according to either wavelength or frequency, i.e., wavelength-division multiplexing (WDM). A local optical network that employs wavelength-division multiplexing is referred to as a wavelength-division multiple access (WDMA) network.

Wavelength-division multiplexing (WDM) is an approach that can exploit the huge opto-electronic bandwidth mismatch by requiring that each end-user's equipment operate only at electronic rate, but multiple WDM channels from different end-user's may be multiplexed on the same fiber. Under WDM, the optical transmission spectrum is carved up into a number of non-overlapping wavelength (or frequency) bands, with each wavelength supporting a single communication channel operating at whatever rate one desires. Accordingly, by allowing multiple WDM channels to co-exist on a single fiber, a user can tap into a huge fiber bandwidth, with the corresponding challenges being the design and development of appropriate network architectures, protocols, and algorithms.

The WDM network constructions are varied time-by-time according to the demand of the networks and the end users. One type of the WDM network's construction is a broadcast-end-select (local) optical WDM network. The local WDM optical network is often constructed by connecting network nodes via two-way fibers to an optical de/multiplexer. A node sends its transmission to the optical multiplexer on one available wavelength, using a laser which produces an optical information stream. The information streams from multiple sources are optically combined by the optical multiplexer, and the signal power of each stream is forwarded to all of the nodes on their receive fibers. A node's receiver, using an optical filter, can be tuned to only one of the wavelengths; hence, it can receive the information stream.

The second most popular WDM network construction is the wavelength-routed (wide-area) optical network. The wide-area optical WDM network includes a photonic switching fabric having active switches connected by fiber links to form an arbitrary physical topology. Each end user is connected to an active switch via a fiber link. The combination of an end user and its corresponding switch is referred to as a network node. Each node (i.e. access station or headend) is equipped with a set of transmitters and receivers, both of which can be wavelength tunable. A transmitter at a node sends data into the network and a receiver receives data from the network. One basic mechanism of communication in a wavelength-routed network is a light path. A light path is an all-optical communication channel between two nodes in the network. The intermediate nodes in the fiber path route the light path in the optical domain using their active switches. The end-nodes of the light path access the light path with transmitters and receivers that are tuned to the wavelength on which the light path operates. A fundamental requirement in the wavelength-routed optical network is that two or more light paths traversing the same fiber link must be on different wavelength channels so that they do not interfere with one another.

Current wide-area networks are designed as electronic networks with fiber links. However, these networks may not be able to take full advantage of the bandwidth provided by optical fibers, because electronic switching components may be incapable of switching the high volume of data which can be transmitted on the fiber links. The next generation of optical networks are being made using optical routers and switching elements to allow all-optical light paths to be set up from a source node to a destination node, thus bypassing electronic bottlenecks at intermediate switching nodes.

With more and more new multi-media services or applications are being used on a network, the cost-effective upgrading of the access network is a challenging task for both operators and vendors. There is a need for an improved hybrid analog-digital WDM access network to solve the network upgrading problem without rebuilding the existing network. In particular, the improved hybrid analog-digital WDM access network has to be compatible with both the existing hybrid fiber-coax (HFC) and switched digital video (SDV) infrastructures.

One solution to the above problems is to replace an entire network system by using high-bandwidth, high-throughput, new generation of optic fibers. This is extremely expensive.

Another solution is often referred to a Fiber To The Curb (FTTC). FTTC network architecture is generally shown in FIG. 4. Each optical network unit (ONU) (also called digital optical node) is connected to a network headend via a pair of fibers. To build a FTTC network, it requires deploying a new fiber plant to make sure that each of the ONUs connects to the network headend. It is also very expensive, especially in the metropolitan areas where the fiber ducts are running in/out and the right of way usually poses significant constrains. Further, for long haul carriers, power loss is very significant. Amplifiers are often used to maintain the quality of the signals. In FIG. 4, the increase of amplifiers almost becomes exponential. The cost associated with additional amplifiers could be very substantial. Accordingly, the proposed FTTC network is only limited to local area networks. In addition, cost of a laser which is the major part of a ONU is still relatively high.

It can be seen that there is a need for a cost-effective, but higher bandwidth in both downstream transmission and upstream transmission, network access system.

It can also be seen that there is a need for a low cost alternative to FTTC or SDV (Switched Digital Video) network access system while still retaining FTTC's basic advantages.

SUMMARY OF THE INVENTION

To overcome the limitations in the prior art described above, and to overcome other limitations that will become apparent upon reading and understanding the present specification, the present invention discloses a wavelength division multiplexing (WDM) technology used in a network access system, and more particularly to a hybrid analog/digital WDM technology used in a network access system.

The present invention solves the above-described problems by providing a hybrid analog/digital wavelength division multiplexing access network system with mini-digital optical nodes.

One embodiment of the present invention is a network system for transmitting/receiving a wavelength of analog signals and a plurality of wavelengths of digital signals, which are bi-directionally communicated between a network and a plurality of users. The network system includes a feeder/de/multiplexer for converting the wavelength of analog signals into electrical signals and demultiplexing the wavelengths of digital signals into a plurality of one-wavelength of digital signals; a plurality of mini-digital optical nodes connecting to the feeder/de/multiplexer via a plurality of optic fibers, respectively, each of the mini-digital optical nodes converting one of the one-wavelength of digital signals into electrical signals; and wherein the analog and digital converted electrical signals are transmitted to the user.

One aspect of the present invention is that both converted signals are transmitted to the user via a coax cable. In an alternative embodiment, the analog converted signals are transmitted to the user via a coax cable, and the digital converted signals are transmitted to the user via a digital line, such as a phone line, etc.

Another aspect of the present invention is that the system provides that electrical signals transmitted from the user via the coax cable are converted into the one-wavelength digital signals at the mini-digital optical node. The one-wavelength digital signals are transmitted to the feeder/de/multiplexer via a second optic fiber and multiplexed with the other one-wavelength digital signals from the other user at the feeder/de/multiplexer.

The present invention is also a method of communicating at least one wavelength of analog signals and a plurality of wavelengths of digital signals between a network headend and a plurality of users, the analog signals and digital signals having different wavelengths. The method includes a downstream transmission having steps of: transmitting at least the one wavelength of analog signals and the wavelengths of digital signals from the network headend to a feeder/de/multiplexer; converting the analog signals to electrical signals at the feeder/de/multiplexer and demultiplexing the wavelengths of digital signals in a one-wavelength per optic fiber format at the feeder/de/multiplexer; transmitting the demultiplexed digital signals to a mini-digital optical node via an optic fiber; converting the demultiplexed digital signals to electrical signals at the mini-digital optic node; and transmitting the analog and digital converted electrical signals to the plurality of the users. The method may also include an upstream transmission having steps of transmitting electrical signals from the users to the mini-digital optical node; converting the electrical signals to the one-wavelength of digital signals to be transmitted via a second optic fiber at the mini-digital optical node; transmitting the converted digital signals from the mini-digital optical node to the feeder/de/multiplexer via the second optic fiber; multiplexing the one-wavelength of digital signals with those from the other users into a multi-wavelength per fiber format at the feeder/de/multiplexer; and transmitting the wavelengths of multiplexed digital signals from the feeder/de/multiplexer to the network headend.

One aspect of the present invention is that in the downstream transmission, the wavelengths of analog and digital signals from a network headend are transmitted to a splitter/de/multiplexer via a first optic fiber; the wavelengths of analog and digital signals are split/demultiplexed into a plurality of branches, each of the branches being a second optic fiber; the analog signals to each of the branches and the digital signals are transmitted to at least one branch and then both are transmitted to the feeder/de/multiplexer; the analog signals are converted to electrical signals at the feeder/de/multiplexer; the wavelengths of the digital signals in at least the one branch are demultiplexed to the one-wavelength per optic fiber format at the feeder/de/multiplexer; the converted analog signals are then transmitted to one of the users via a coax cable; the demultiplexed digital signals are transmitted to the mini-digital optical node via a third optic fiber; the digital signals are then converted to electrical signals; and the electrical signals are transmitted to the user via the coax cable or a digital line.

Further aspect of the method is that in the upstream transmission, the electrical signals are transmitted from the user to the mini-digital optical node via the coax cable or the digital line; the electrical signals are converted to the one-wavelength of digital signals to be transmitted via a fourth optic fiber at the mini-digital optical node; the converted one-wavelength of digital signals are transmitted from the mini-digital optical node to the feeder/de/multiplexer via the fourth optic fiber; then, the one-wavelength of digital signals from the other users are multiplexed into a multi-wavelength per fiber format at the feeder/de/multiplexer; the wavelengths of multiplexed digital signals are transmitted from the feeder/de/multiplexer to the splitter/de/multiplexer via a fifth cable; next, the wavelengths of the digital signals are combined/multimplexed from other branches at the splitter/de/multiplexer; and finally, the wavelengths of combined/multiplexed digital signals are transmitted from the splitter/de/multiplexer to the network headend through a sixth optic fiber.

The present invention is further a hybrid analog/digital wavelength-division multiplexing access network system. The hybrid analog/digital WDM access network system includes: a network for transmitting at least one wavelength of analog signals and a first plurality of wavelengths of digital signals to a plurality of users wherein the analog signals and the digital signals have different wavelengths, and for receiving a second plurality of wavelengths of digital signals from the users wherein the second plurality of wavelengths of digital signals have the same wavelengths as the first plurality of wavelengths of digital signals, the network having a backbone containing at least the one wavelength of analog signals and the first plurality of wavelengths of digital signals, the network having at least one headend which accesses the backbone of the network; a first optic fiber; a splitter/de/multiplexer, the first optic fiber extending between at least the one headend and the splitter/de/multiplexer, the first plurality of wavelengths of digital signals being transmitted from the headend to the splitter/de/multiplexer via the first optic fiber and being demultiplexed and split into a plurality of branches of optic fibers, the analog signals being transmitted to each of the branches; a second optic fiber; a feeder/de/multiplexer, the second optic fiber extending between the splitter/de/multiplexer and the feeder/de/multiplexer, the analog signals and the digital signals in one of the branches being transmitted from the splitter/de/multiplexer to the feeder/de/multiplexer, the analog signals in the branch being converted into electrical signals by the feeder/de/multiplexer, and the digital signals in the branch being demultiplexed by the feeder/de/multiplexer into a one-wavelength per optic fiber format; a third optic fiber being a one-wavelength optic fiber; a mini-digital optical node, the one-wavelength optic fiber extending between the feeder/de/multiplexer and the mini-digital optical node for transmitting a one-wavelength of digital signals to the mini-digital optical node, wherein the digital signals being converted to electrical signals at the mini-digital optical node; a coax cable, extending from the feeder/de/multiplexer to the user, the analog converted electrical signals being transmitted from the feeder/de/multiplexer to the user via the coax cable, the digital converted electrical signals being transmitted from the mini-digital optic node to the user via the coax cable.

Other embodiments of a system in accordance with the principles of the invention may include alternative or optional additional aspects. One such aspect of the present invention is that the downstream transmission bandwidth can be in a range of 550–1000 MHz, and the upstream transmission bandwidth can reach in a range of 750–1000 MHz.

Further aspect of the present invention is that the signals on the network are at least one analog video signal and at least two baseband digital signals of different wavelength. In the downstream transmission, the analog signal is converted to an electrical signal at the feeder/de/multiplexer point to meet Carrier to Noise Ratio (CNR) requirements, and in the upstream transmission, the electrical signals are converted to the digital signals at the mini-digital optical node. Further, in the downstream transmission, the digital signals are demultiplexed at the feeder/de/multiplexer point into a one wavelength per fiber format, and in the upstream transmission, signals with different wavelength per fiber are multiplexed at the feeder/de/multiplexer point.

Additional aspect of the present invention is that the system includes a one-way filter on the coax cabin proximate the mini-digital optical node so as to prevent interference between mini-digital node serving areas.

Yet another aspect of the present invention is that the power of the mini-digital optical node is supplied via the coax cable. Also, the mini-digital optical node can be replaced by a personal communication system (PCS) base station.

Still aspect of the present invention is that optic fibers which are paired may have the same number of digital wavelengths.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

Figure 1:
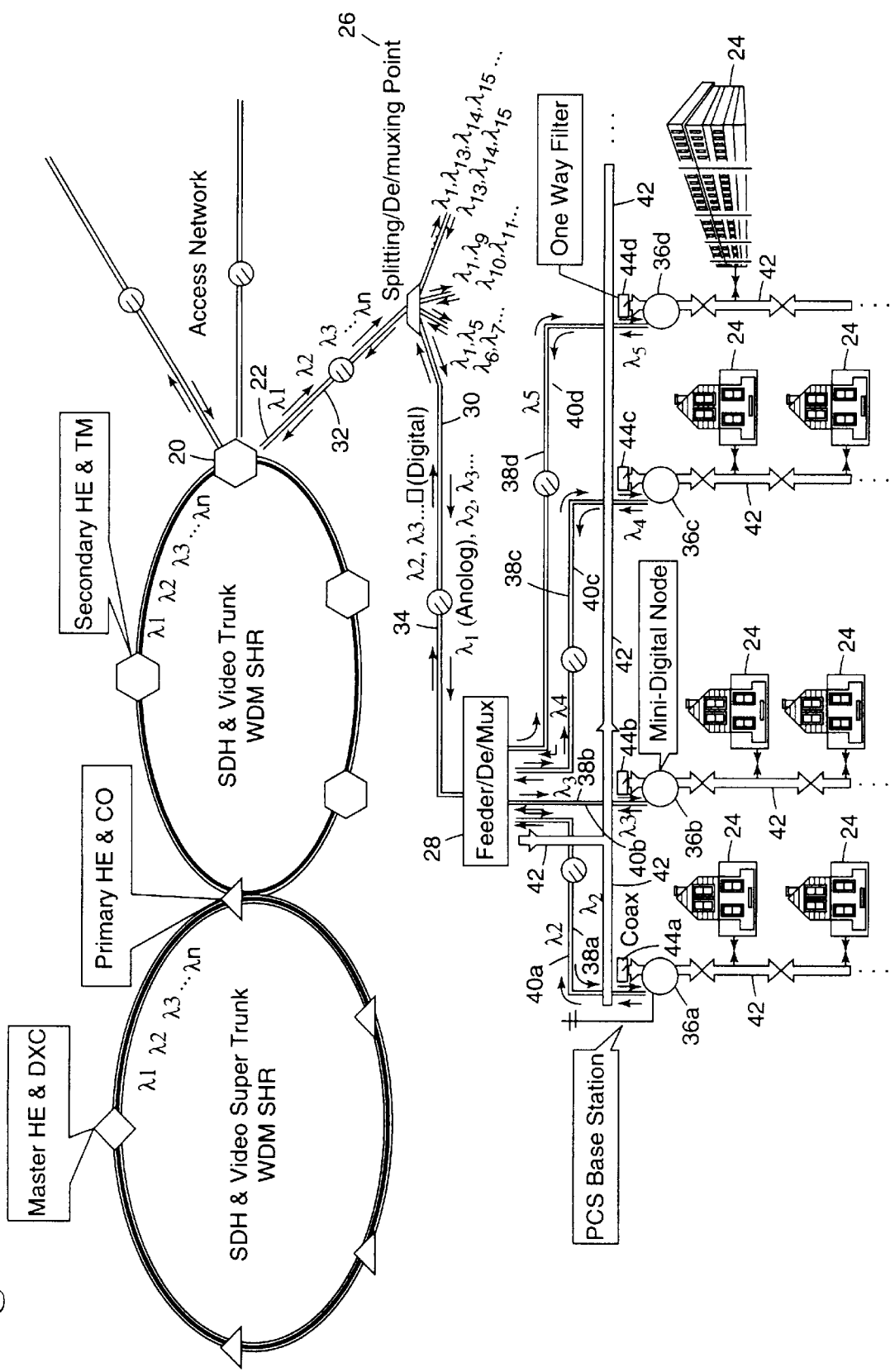
FIG. 1 illustrates a hybrid analog/digital wavelength division multiplexing access network with mini-digital optical node in accordance with the present invention.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a new approach to solve a network upgrading problem without rebuilding the existing network. The new approach is suitable for both Hybrid Fiber-Coax (HFC) and Switched Digital Video (SDV) infrastructures. In the new approach, a network contains hybrid analog signals, e.g. analog video signals, and several digital signals, e.g. baseband digital signals, on different wavelengths in one fiber originating from a network headend. The analog signal may often be for broadcast use and is split into several branches (e.g. four branches as in the existing CATV network). Generally, at the same splitting point, groups of digital signals (e.g. wavelength) may be demultiplexed into these branches. A feeder point is where the analog signal is converted to an electrical signal and transmitted via coax cable in order to meet Carrier Noise Ratio (CNR) or Signal Noise Ratio (SNR) requirements. The baseband digital signals may be demultiplexed at feeder points into one wavelength per fiber. Because an optical de/multiplexer has a very low insertion loss (typically less than 1 dB), the digital signal has sufficient power to be transmitted to closer to a customer. In one embodiment of the present invention, at the end of the digital fiber (i.e. where all analog and digital signals have been converted into electrical signals), a mini-digital optical node is provided. The power at the mini-digital optical node can be supplied by a coax cable. From the mini-digital optical node to the user's premise, either HFC (bus) or SDV (star) can be used depending on the existing network architecture or operator's preference. The above described is a downstream transmission from the network headend to a user. In an upstream transmission, signals from the user to the mini-digital optical node is able to use an upper frequency band, for example over 750 MHz, to avoid the ingress noise, particularly in a HFC system. In one embodiment, the mini-digital optical node can be replaced by a Personal Communication System (PCS) base station.

The present invention also provides that the upstream traffic from a user is electronically multiplexed or converted at the mini-digital optical node and transmitted back to the network headend via a specific wavelength. The upstream optical wavelength is multiplexed with that of other users at feeder points and splitting points thereafter. The number of usable wavelengths in one fiber is unlimited due to the nature of passive optical network (PON). In the existing CATV system, the distance between feeder and network headend is limited by the analog system, which will not impose any problem for the digital signals in the present invention. In addition, the return optical fiber will contain the same number of digital wavelengths as that in the downstream fiber.

FIG. 1 illustrates a hybrid analog/digital wavelength division multiplexing access network with mini-digital optical node in accordance with the present invention. The acronym used in FIG. 1 are as follows:

HE: Headend
SDH: Synchronous Digital Hierarchy
SHR: Self-Healing Ring
CO: Central Office
PCS: Personal Communication System
Demux: Optical Demultiplexer
TM: Terminal Multiplexer
DXC: Digital Cross Connection As shown in FIG. 1, the left side Self-Healing Ring (SHR) represents an architecture of channels of information including digital, analog signals, and their equivalents. The analog signals may include video, voice, and their equivalents. The digital signals may include baseband, passband, and their equivalents, digital signals. The Master HE & DXC (pointing to the diamond shape) represents that this headend or cross connection contains almost all digital and analog and their equivalent signals. The ring is often region wide and may receive these signals from a satellite system outer space. The triangle shape named Primary HE & CO represents that this headend or central office contains a majority portion of the signals from the Master HE & DXC. The Primary HE & CO may drop or add-in different signals for a smaller region purpose, such as for local advertisement within a state.

The right side Self-Healing Ring (SHR) represents a ring which includes many analog video signals. The hexagonal shape headend is named Secondary HE & TM which represents that this headend or terminal multiplexer contains a smaller portion of the signals from the Master HE & DXC. As shown, one of the headend is shown to be accessed by a network access system. $\lambda_1, \lambda_2, \lambda_3, \ldots \lambda_n$ represent different wavelengths of the signals.

Once a network access is demanded at headend 20, the demanded signals are transmitted at the headend 20 via an optic fiber 22 to a splitting/de/multiplexing point 26, at which point a splitter/de/multiplexer is connected. For illustration, $\lambda_1$ represents an analog signal, whereas $\lambda_2$, $\lambda_3, \ldots \lambda_n$ represent digital signals. At the headend 20, a transmitter/receiver (not shown) transmits different wavelengths of the signals is one optic fiber 22. Since the signals are downloaded from the network, the transmission from the network headend to users 24 is hereafter called downstream transmission. When the users 24 transmit signals to the network, i.e. the signals are uploaded from the users to the network, the transmission is hereafter called upstream transmission. Arrows in FIGS. 1–4 are to label the downstream and upstream transmissions.

In the downstream transmission, at the splitting point 26, the analog signal(s) is split into different branches, e.g. four branches which is common in CATV system. It will be appreciated that any numbers of branches can be implemented by a person skilled in the art without departure from the principles of the invention. As shown in FIG. 1, $\lambda_1$ is broadcast to each of the four branches. The wavelengths of digital signals are demultiplexed into different branches and are not broadcast to each branch. The digital signals are transmitted according to the demand of the user. As such, only a portion of the wavelengths of the digital signals may be transmitted with $\lambda_1$ to a feeder/de/multiplexing point 28 via an optic fiber 30.

In the upstream transmission, at the splitting/de/multiplexing point 26, branches of wavelengths of digital signals transmitted from the feeder/de/multiplexing point 28 via an optic fiber 34 are multiplexed into different branches. The combined/multiplexed digital signals are then transmitted to the headend 20 via an optic fiber 32. Optic fibers 22 and 32 are substantially parallel to each other, and optic fibers 30 and 34 are substantially parallel to each other. In addition to the other wavelengths, the downstream optic fibers 22, 30 carry the wavelength $\lambda_1$, whereas the upstream optic fibers 34, 32 do not. This is simply the network design choice as the users usually do not transmit a broadcast type of signals. However, it will be appreciated to a person skilled in the art to implement a design which allows a user to up-transmit an analog signal.

In the downstream transmission, at the feeder/de/multiplexing point 28, the wavelengths $\lambda_2, \lambda_3, \ldots \lambda_n$ are demultiplexed by a demultiplexer into different optic fibers (see later) such that each wavelength is carried by one optic fiber. The analog signals with wavelength $\lambda_1$ are converted into electrical signals. The electrical signals are then broadcast to the users 24 via a coax cable 42.

A plurality of mini-digital optical nodes 36a, 36b, 36c, 36d, . . . 36n are connected to the feeder/de/multiplexing point 28 via pairs of downstream optic fibers 38a, 38b, 38c, 38d, . . . 38n and upstream optic fibers 40a, 40b, 40c, 40d, . . . 40n, respectively. Each pair of downstream and upstream optic fibers, e.g. 38a, 40a, are substantially parallel to each other. For illustration, only one branch from the feeder/de/multiplexing point 28 to the mini-digital optical node 36a is discussed herewith. The other branches may use the same or similar structure, implementation, and operation.

In the downstream transmission, at the mini-digital optical node 36a, one-wavelength $\lambda_2$ of digital signals are transmitted from the feeder/de/multiplexing point 28 via the optic fiber 38a. The digital signals are converted into electrical signals at the mini-digital optical node 36a and transmitted to the users 24 via the coax cable 42. The digital converted electrical signals can be transmitted to the users 24 along with the analog converted electrical signals.

In the upstream transmission, at the mini-digital optical node 36a, electrical signals sent by the users 24 are transmitted via the coax cable 42 and are converted into optical (digital) signals. The digital signals are transmitted via the optic fiber 40a with a wavelength $\lambda_2$ to the feeder/de/multiplexing point 28.

A one-way filter 44a is disposed on the coax cable 42 proximate to the mini-digital optical node 36a area. The one-way filter 44a only allows the analog-converted electrical signals to pass through in the downstream transmission and prevents the electrical signals sent by the users 24 from passing through to travel back to the feeder/de/multiplexing point 28 or travel to other branches. As such, the one-way filter 44a prevents interference between mini-digital node serving areas. One-way filters 44b, 44c, 44d . . . 44n are used at other branches. Accordingly, the electrical signals sent by the users 24 are transmitted through the mini-optical node 36a to the feeder/de/multiplexing point 28, whereby the wavelengths $\lambda_2, \lambda_3, \ldots \lambda_n$ from different branches are multiplexed into one optic fiber 34.

Since the distance between the mini-digital optical node and the users is short, the upstream signals from the users to the mini-digital optical nodes are able to use upper band frequency, such as over 750 MHz (e.g. 750–1000 MHz), to increase the transmission bandwidth and throughput (bits per second) capacity and further to avoid the ingress noise prevalent in the Hybrid Fiber Coax (HFC) network.

Figure 3:
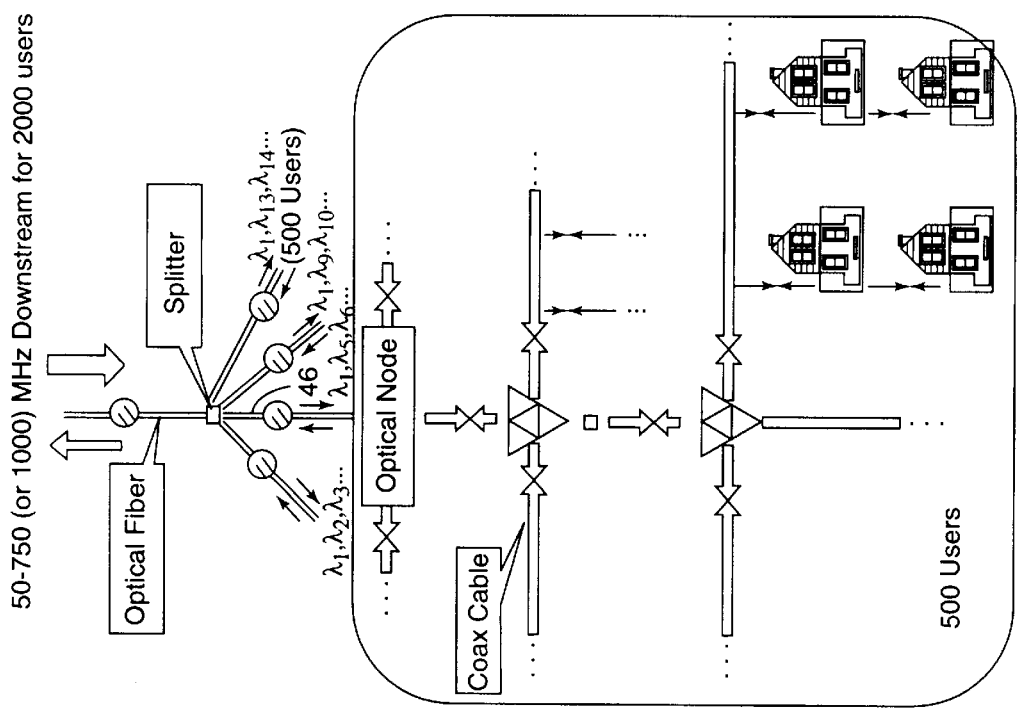
FIG. 3 illustrates a traditional Hybrid Fiber Coax (HFC) network in a 50–750 MHz (or 1000 MHz) downstream for 2000 users.

Compared to the traditional HFC network as shown in FIG. 3, the present invention significantly increases the upstream transmission bandwidth and throughput capacity. In the traditional HFC network, the digital service typically use 550–750 MHz for downstream transmission, assuming the coax amplifier allows bandwidth up to 750 MHz, and only 5–50 MHz for upstream transmission. This bandwidth translates into throughput capacity of 800 Mbps (Mega bits per second) for downstream and 160 Mbps for upstream if using 64 QAM (Quadrature Amplitude Modulation) for modulation. The capacity is typically shared by about 2000 users in one fiber 46 serving the entire framed area as illustrated in FIG. 3. The present invention provides a hybrid analog/digital WDM system and method, given the same network configuration, a 16-wavelength WDM system serves 125 users per wavelength. If the same 550–750 MHz bandwidth is used for downstream transmission from the mini-digital node to the user's premise, the 800 Mbps capacity is shared by 125 users—thus, largely increases the capacity. In addition, when the mini-digital optical node is within the passive coax range, the usable frequency can be beyond the coax amplifier's limitation, e.g. to 1 GHz. For the range of 550–1000 MHz bandwidth, about 2 Gbps capacity can be delivered to 125 users. Accordingly, the speed and capacity in downstream transmission are dramatically improved by the present invention.

Further, with the optic fiber, e.g. 38a, 40a, closer to the users by using the mini-digital optical node 36a, the present invention not only increases the downstream capacity for each user, but also allows the frequency in upstream transmission to be in the upper band, e.g. 750–1000 MHz, which increases the speed and capacity in upstream transmission and avoids the noisy lower band, such as 5–50 MHz in the traditional system. This shift to the upper band also makes more bandwidth available in upstream transmission.

Furthermore, although the wavelengths of digital signals are demultiplexed twice, optical demultiplexer generally has very low insertion loss (typically less than 1 dB). Therefore, the digital signals have sufficient power to be transmitted mini-digital optical nodes which are close to the users. The power to the mini-digital optical node may be supplied via the coax cable 42.

Also, it will be appreciated to a person of ordinary skill in the art that, if a higher capacity of downstream and/or upstream transmissions is required, a multi-wavelength per fiber format can be implemented at the feeder/de/multiplexing point.

Figure 2:
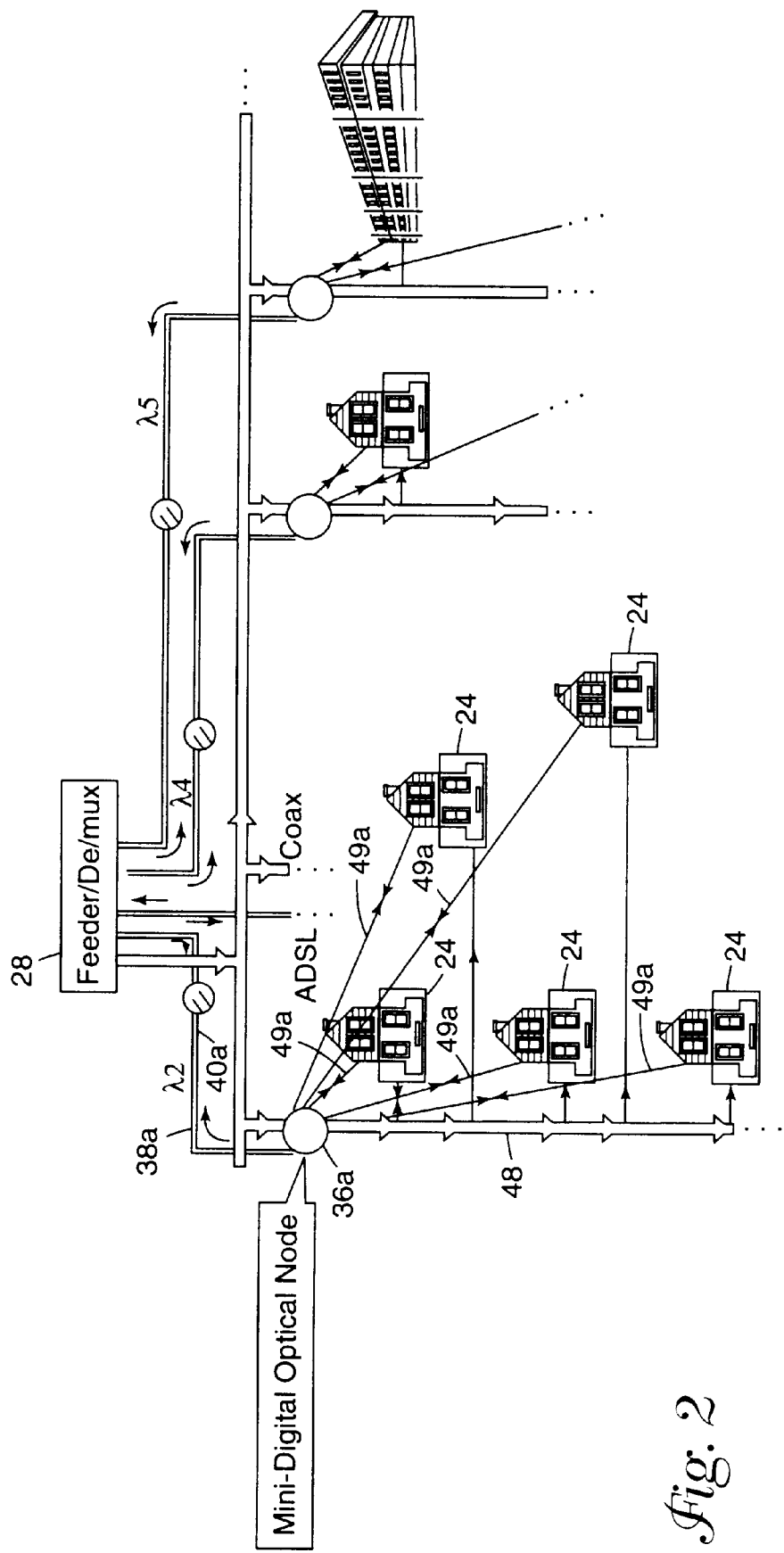
FIG. 2 illustrates a switched digital video configuration of mini-digital optical node in accordance with the present invention.
Figure 4:
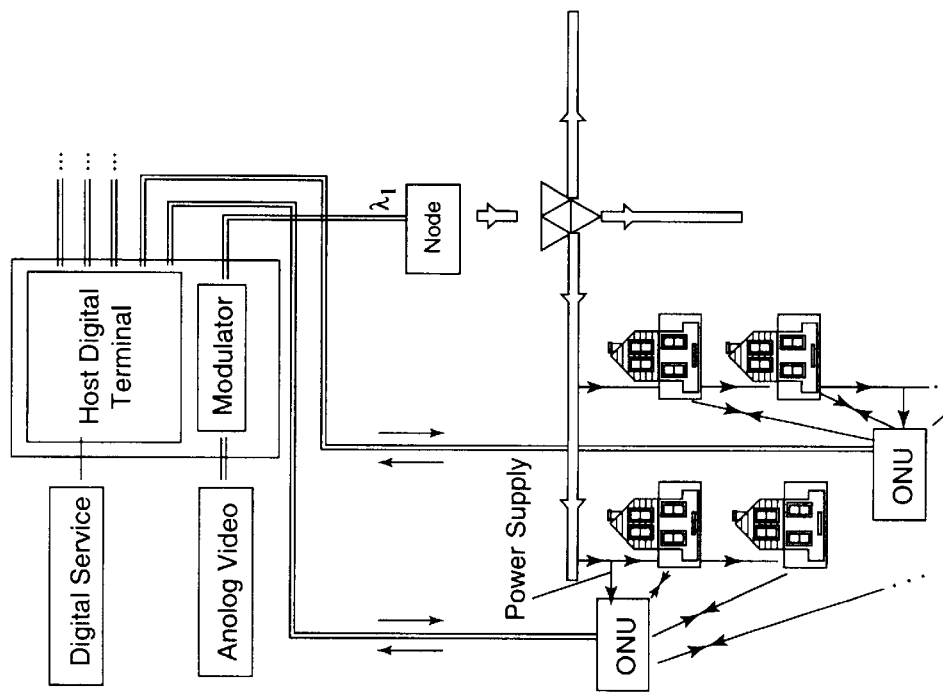
FIG. 4 illustrates a proposed FTTC network with a plurality of Optical Network Units (ONU).

From the mini-digital nodes to the users, either Hybrid Fiber Coax (HFC) configuration as shown in FIG. 1 or Switched Digital Video (SDV) configuration as shown in FIG. 2, can be used depending on the existing network infrastructure or operator's preference.

Referring to FIG. 2, a SDV configuration of mini-digital optical node is illustrated in accordance with the present invention. FIG. 1 shows a bus-type of HFC configuration wherein the digital converted electrical signals are transmitted with the analog converted electrical signals on the same coax cable 42. In FIG. 2, a star-type of SDV configuration is shown wherein the digital converted electrical signals are transmitted from the mini-digital optical node 36a via data lines 49a, such as phone lines or other types of Asymmetrical Digital Subscription Line (ADSL), etc. Accordingly, in the downstream transmission, the analog converted electrical signals are sent to the users via a coax cable 48, and the digital converted electrical signals are sent to the users via data lines 49a. Similarly, in the upstream transmission, the electrical signals from the users 24 are sent to the mini-digital optical node 36a to be converted and sent to the feeder/de/multiplexing point 28 via the optic fiber 40a.

In FIG. 2, since the upstream transmission is performed via lines 49a, the upstream signals are not transmitted on the coax cable 48 back to the feeder/de/multiplexing point 28 or possible other branches. Accordingly, the one-way filter can be eliminated.

It will be appreciated that other types of implementations can be used for the inventions shown in FIGS. 1 and 2 without departure from the principles of the present invention. For example, the mini-digital optical node can be replaced by a standard Personal Communication Station (PCS) base station.

Figure 5:
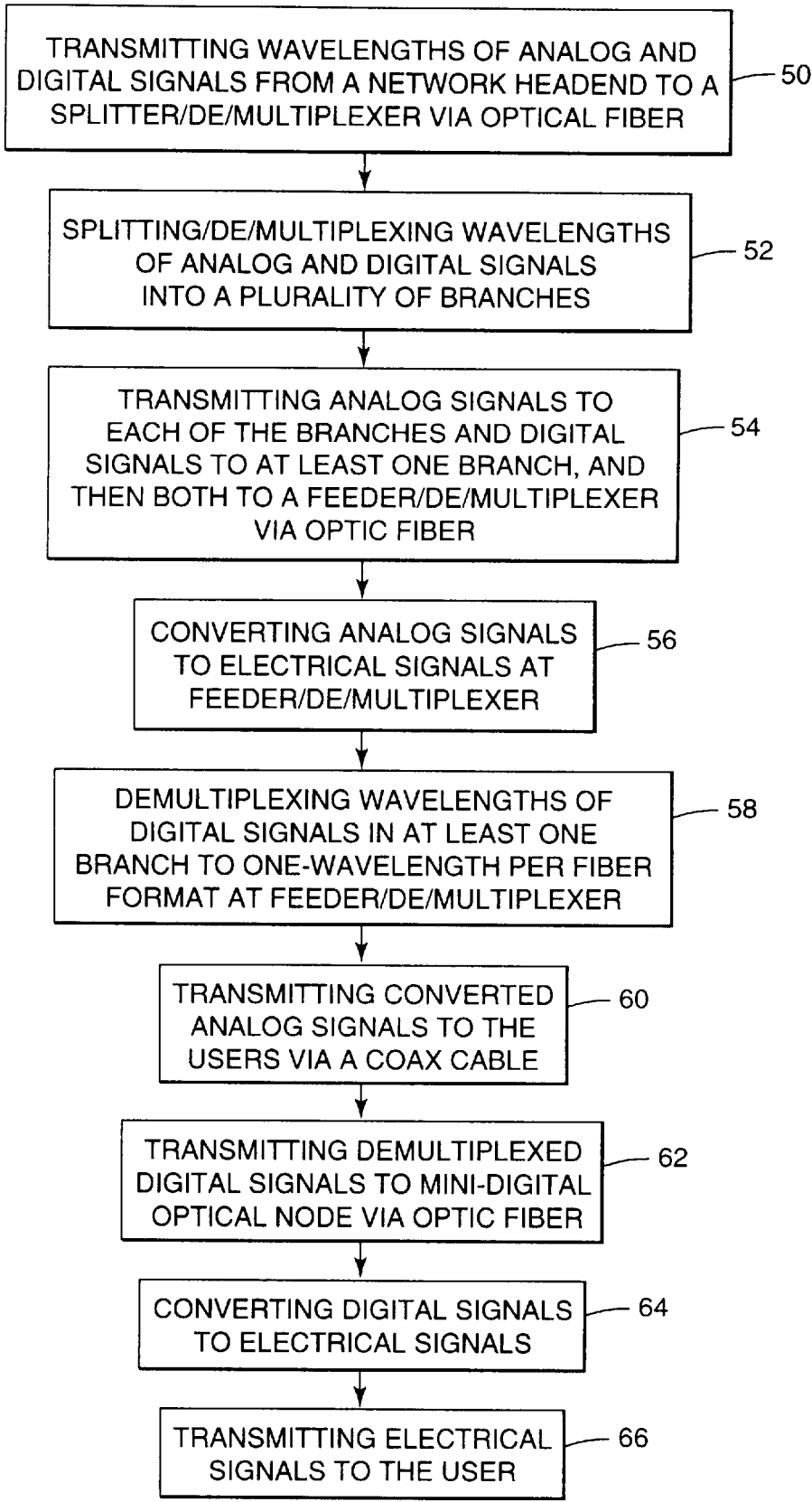
FIG. 5 is a flow chart illustrating a downstream operation of the network access system in accordance with the present invention.
Figure 6:
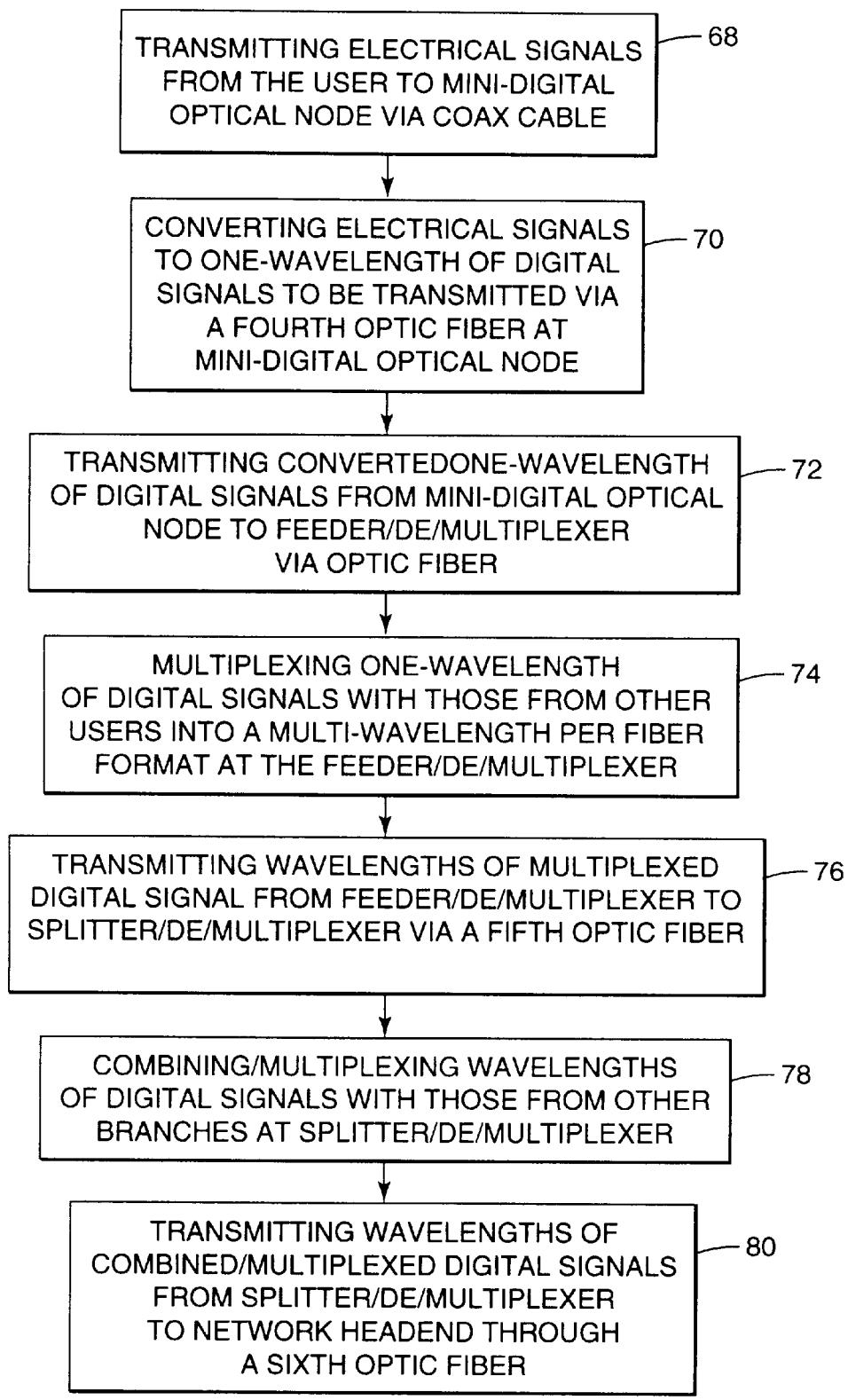
FIG. 6 is a flow chart illustrating an upstream operation of the network access system in accordance with the present invention.

FIGS. 5 and 6 are flow charts illustrating downstream and upstream operations, respectively, of a network access system consistent with the present invention. The flow charts in FIGS. 5 and 6 summarize the above detailed discussion, which can be used in many other network access systems.

In a downstream transmission operation as shown in FIG. 5, box 50, wavelengths of analog and digital signals from a network headend to a splitter/de/multiplexer via optical fiber. The wavelengths of the analog and digital signals are split/demultiplexed into a plurality of branches, as shown in box 52. Then, the analog signals to each of the branches and the digital signals are transmitted to at least one branch, and then transmit both signals to a feeder/de/multiplexer, as shown in box 54. Next, the analog signals are converted to electrical signals by the feeder/de/multiplexer, as shown in box 56. Next, the wavelengths of digital signals in at least one branch are demultiplexed to a one-wavelength per fiber format by the feeder/de/multiplexer, as shown in box 58. Then, the converted analog signals are transmitted to at least one of the users via a coax cable, as shown in box 60. The demultiplexed digital signals are transmitted to mini-digital optical nodes via optic fiber, as shown in box 62. Then, the digital signals are converted to electrical signals at the mini-digital optical nodes, as shown in box 64. The electrical signals are transmitted to the user in box 66.

In an upstream transmission operation as shown in FIG. 6, box 68, electrical signals from the users are transmitted to the mini-digital optical nodes. Then, electrical signals are converted to one-wavelength of digital signals to be transmitted via optical fiber at the mini-digital optical node, as shown in box 70. Then, the converted one-wavelength of digital signals are transmitted to the feeder/de/multiplexer via optic fiber, as shown in box 72. Next, one-wavelength of digital signals are multiplexed with those from the other users into a multi-wavelength per fiber format at the feeder/de/multiplexer, as shown in box 74. Then, wavelengths of multiplexed digital signals are transmitted from the feeder/de/multiplexer to the splitter/de/multiplexer via optic fiber, as shown in box 76. Wavelengths of digital signals are combined/multiplexed with those from the other branches at the splitter/demultiplexing point, as shown in box 78. Finally, wavelengths of combined/multiplexed digital signals are transmitted from the splitter/de/multiplexer to a network headend through optic fiber.

It will be appreciated that the sequence or order of the downstream and upstream operations can be varied without departure from the principles of the invention. FIGS. 5 and 6 are merely for illustration purposes.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A hybrid analog/digital wavelength-division multiplexing access network system, comprising:

a network for transmitting at least one wavelength of analog signals and a first plurality of wavelengths of digital signals via a first optic fiber to a plurality of users wherein the analog signals and the digital signals have different wavelengths, and for receiving a second plurality of wavelengths of digital signals from the users wherein the second plurality of wavelengths of digital signals have the same wavelengths as the first plurality of wavelengths of digital signals, the network having a backbone containing at least the one wavelength of analog signals and the first plurality of wavelengths of digital signals, the network having at least one headend which accesses the backbone of the network;

a splitter/de/multiplexer, the first optic fiber extending between at least the one headend and the splitter/de/multiplexer, the first plurality of wavelengths of digital signals and the at least one wavelength of analog signals being transmitted from the headend to the splitter/de/multiplexer via the first optic fiber and the first plurality of wavelengths of digital signals being demultiplexed and split into a plurality of branches of optic fibers, the analog signals being transmitted to each of the branches;

a second optic fiber;

a feeder/de/multiplexer, the second optic fiber extending between the splitter/de/multiplexer and the feeder/de/multiplexer, the analog signals and the digital signals in one of the branches being transmitted from the splitter/de/multiplexer to the feeder/de/multiplexer, the analog signals in the branch being converted into electrical signals by the feeder/de/multiplexer, and the digital signals in the branch being demultiplexed by the feeder/de/multiplexer into a one-wavelength per optic fiber format;

a third optic fiber being a one-wavelength optic fiber;

a mini-digital optical node disposed near users, the one-wavelength optic fiber extending between the feeder/de/multiplexer and the mini-digital optical node for transmitting a one-wavelength of digital signals to the mini-digital optical node, wherein the digital signals being converted to electrical signals at the mini-digital optical node;

a coax cable, extending from the feeder/de/multiplexer to the user, the analog converted electrical signals being transmitted from the feeder/de/multiplexer to the user via the coax cable, the digital converted electrical signals being transmitted from the mini-digital optic node to the user via the coax cable.

2. The system of claim 1, wherein the second plurality of wavelengths of digital signals are transmitted from the splitter/de/multiplexer to the headend via a fourth optic fiber and are formed by combining/multiplexing branches of the digital signals, the wavelengths of digital signals being transmitted from the feeder/de/multiplexer via a fifth optic fiber, the feeder/de/multiplexer multiplexing branches of the one-wavelength of digital signals which are transmitted from the mini-digital optical node via a sixth optic fiber, the one-wavelength of digital signals being transmitted from the mini-digital optical node whereby the electrical signals transmitted by the user via the coax cable are converted.

3. The system of claim 2, wherein the fourth optic fiber is substantially parallel to the first optic fiber.

4. The system of claim 2, wherein the fifth optic fiber is substantially parallel to the second optic fiber.

5. The system of claim 2, wherein the sixth optic fiber is substantially parallel to the third optical fiber.

6. The system of claim 2, bandwidth of an upstream transmission from the users to the network can be in a range of 750–1000 MHz.

7. The system of claim 2, wherein in the upstream transmission, the digital signals are converted into the one-wavelength at the mini-digital optical node and are multiplexed with other one-wavelengths of digital signals at the feeder/de/multiplexer point.

8. The system of claim 2, wherein the first and fourth optic fibers contain the same number of digital wavelengths.

9. The system of claim 2, wherein the second and fifth optic fibers contain the same number of digital wavelengths.

10. The system of claim 2, wherein the third and sixth optic fibers contain the same number of digital wavelengths.

11. The system of claim 1, wherein between the mini-digital optical node and each of the users, a hybrid fiber/coax bus type of structure is formed.

12. The system of claim 11, further comprising a one-way filter disposed on the coax cable between the feeder/de/multiplexer and the user proximate the mini-digital optical node being adapted to prevent the digital signals, transmitted from the user traveling on the coax cable, from interfering the analog signals transmitted on the coax cable of the other branches.

13. The system of claim 1, wherein between the mini-digital optical node and each of the users, a switched digital video star type of structure is formed.

14. The system of claim 1, bandwidth of a downstream transmission from the network to the users can be in a range of 550–1000 MHz.

15. The system of claim 8, wherein in the downstream transmission, the analog signal is broadcast to each of the users with a same wavelength as on the network.

16. The system of claim 8, wherein in the downstream transmission, the digital signals with different wavelengths are demultiplexed at the feeder/de/multiplexer point into the one wavelength per optic fiber format such that only one wavelength of the digital signals is transmitted on the third optic fiber, and in the upstream transmission, signals with different wavelength per fiber are multiplexed at the feeder/de/multiplexer point.

17. The system of claim 1, wherein the analog signals are video signals, and the digital signals are baseband digital signals.

18. The system of claim 1, wherein power of the mini-digital optical node is supplied via the coax cable.

19. The system of claim 1, wherein the mini-digital optical node is adapted to be a personal communication system (PCS) base station.

20. A method of communicating at least one wavelength of analog signals and a plurality of wavelengths of digital signals between a network headend and a plurality of users, the analog signals and digital signals having different wavelengths, comprising the steps of:

transmitting the wavelengths of analog and digital signals from a network headend to a splitter/de/multiplexer via a first optic fiber;

splitting/demultiplexing the wavelengths of analog and digital signals into a plurality of branches, each of the plurality of branches being a second optic fiber;

transmitting the analog signals to each of the plurality of branches and the digital signals to at least one of the plurality of branches, and then both to a feeder/de/multiplexer;

converting the analog signals to electrical signals at the feeder/de/multiplexer;

demultiplexing the wavelengths of the digital signals in at least the one branch to a one-wavelength per optic fiber format at the feeder/de/multiplexer;

transmitting the converted analog signals to one of the users via a coax cable;

transmitting the demultiplexed digital signals to a mini-digital optical node disposed near users via a third optic fiber;

converting the digital signals to electrical signals; and transmitting the electrical signals to the user.

21. The method of 10, further comprising the steps of:

transmitting the electrical signals from the user to the mini-digital optical node;

converting the electrical signals to the one-wavelength of digital signals to be transmitted via a fourth optic fiber at the mini-digital optical node;

transmitting the converted one-wavelength of digital signals from the mini-digital optical node to the feeder/de/multiplexer via the fourth optic fiber;

multiplexing the one-wavelength of digital signals from other users into a multi-wavelength per fiber format at the feeder/de/multiplexer;

transmitting the wavelengths of multiplexed digital signals from the feeder/de/multiplexer to the splitter/de/multiplexer via a fifth optic fiber;

combining/multiplexing the wavelengths of the digital signals from other branches at the splitter/de/multiplexer; and transmitting the wavelengths of combined/multiplexed digital signals from the splitter/de/multiplexer to the network headend through a sixth optic fiber.

22. A network system for transmitting/receiving a wavelength of analog signals and a plurality of wavelengths of digital signals, which are bi-directionally communicated between a network and a plurality of users, comprising:

a feeder/de/multiplexer for receiving wavelength of analog signals and a plurality of wavelengths of digital signals via an optical fiber and converting the wavelength of analog signals into electrical signals and demultiplexing the plurality of wavelengths of digital signals into a plurality of one-wavelength of digital signals;

a plurality of mini-digital optical nodes disposed near users connecting to the feeder/de/multiplexer via a plurality of optic fibers, respectively, each of the plurality of mini-digital optical nodes converting one of the one-wavelength of digital signals into electrical signals; and wherein the analog and digital converted electrical signals are transmitted to the users.

23. The network system of claim 22, wherein the analog and digital converted electrical signals are transmitted to the users via a coax cable.

24. The network system of claim 22, wherein the analog converted electrical signals are transmitted to the users via a coax cable, the digital converted electrical signals are transmitted to the user via a digital line.

25. The network system of claim 23, wherein electrical signals transmitted from the user via the coax cable are converted into the one-wavelength digital signals at the mini-digital optical node, the one-wavelength digital signals are transmitted to the feeder/de/multiplexer via a second optic fiber and multiplexed with the other one-wavelength digital signals from the other user at the feeder/de/multiplexer.

26. The network system of claim 24, wherein electrical signals transmitted from the user via the digital line are converted into the one-wavelength digital signals at the mini-digital optical node, the one-wavelength digital signals are transmitted to the feeder/de/multiplexer via a second optic fiber and multiplexed with the other one-wavelength digital signals from the other user at the feeder/de/multiplexer.

27. A method of communicating at least one wavelength of analog signals and a plurality of wavelengths of digital signals between a network headend and a plurality of users, the analog signals and digital signals having different wavelengths, comprising the steps of:

transmitting at least the one wavelength of analog signals and the wavelengths of digital signals from the network headend to a feeder/de/multiplexer via a first optic fiber;

converting the analog signals to electrical signals at the feeder/de/multiplexer and demultiplexing the wavelengths of digital signals in a one-wavelength per optic fiber format at the feeder/de/multiplexer;

transmitting the demultiplexed digital signals to a mini-digital optical node disposed near users via a second optic fiber;

converting the demultiplexed digital signals to electrical signals at the mini-digital optic node; and transmitting the analog and digital converted electrical signals to the plurality of the users.

28. The method of 27, further comprising the steps of:

transmitting electrical signals from the users to the mini-digital optical node;

converting the electrical signals to the one-wavelength of digital signals to be transmitted via a second optic fiber at the mini-digital optical node;

transmitting the converted digital signals from the mini-digital optical node to the feeder/de/multiplexer via the second optic fiber;

multiplexing the one-wavelength of digital signals with those from the other users into a multi-wavelength per fiber format at the feeder/de/multiplexer; and transmitting the wavelengths of multiplexed digital signals from the feeder/de/multiplexer to the network headend.

* * * * *